(12) United States Patent
Zhang

(10) Patent No.: US 7,916,868 B1
(45) Date of Patent: Mar. 29, 2011

(54) QUADRATIC RESIDUE BASED PASSWORD AUTHENTICATED KEY EXCHANGE METHOD AND SYSTEM

(75) Inventor: Muxiang Zhang, Malden, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 1270 days.

(21) Appl. No.: 11/123,295

(22) Filed: May 6, 2005

Related U.S. Application Data

(60) Provisional application No. 60/568,624, filed on May 6, 2004.

(51) Int. Cl.
*H04K 1/00* (2006.01)
(52) U.S. Cl. .................................................. 380/255
(58) Field of Classification Search ............... 380/255
See application file for complete search history.

(56) References Cited

U.S. PATENT DOCUMENTS

| | | | | |
|---|---|---|---|---|
| 5,140,634 | A | * | 8/1992 | Guillou et al. ............ 713/180 |
| 7,047,408 | B1 | * | 5/2006 | Boyko et al. ............. 713/169 |
| 2002/0194478 | A1 | * | 12/2002 | MacKenzie ............. 713/171 |

OTHER PUBLICATIONS

Kefei Chen, "Authenticated Encryption Scheme BAsed on Qudaratic Residue", Oct. 29, 1998, IEEE Electronics Letters (vol. 34, No. 22) pp. 2115-216.*
M. Scott, "Securuity of ID-Based Key Exchange Scheme", Apr. 2, 1998, IEEE Electronic Letters (vol. 34, No. 7) pp. 653-654).*
Clifford Cocks, "An Identity Based Encryption Scheme Based on Quadratic Residues", 2001, Springer-Verlag, Cryptography and Coding 2001, pp. 360-363.*
Gunther et al., "An Identity-Based Key-Exchange Protocol", 1990, Springer-Verlag, Advances in Cryptology—Eurocrypt ' 89 pp. 29-37.*
Victor Boyko et al., "Provably Secure Password-Authenticated Key Exchange Using Diffie-Hellman," Jul. 12, 2000.
Stefan Lucks, "Open Key Exchange: How to Defeat Dictionary Attacks Without Encrypting Public Keys.".
Mihir Bellare et al., "Authenticated Key Exchange Secure Against Dictionary Attacks," 2000.
Steven M. Bellovin et al., Encrypted Key Exchange: Password-Based Protocols Secure Against Dictionary Attacks,: IEEE Symposium on Research in Security and Privacy, May 1992.
Steven M. Bellovin et al., "Augmented Encrypted Key Exchange: a Password-Based Protocol Secure Against Dictionary Attacks and Password File Compromise," Nov. 1993.
Mihir Bellare et al., "Random Oracles are Practical: A Paradigm for Designing Efficient Protocols," First ACM Conference on Computer and Communications Security, SCM, Nov. 1993.
Mihir Bellare et al., "Entity Authentication and Key Distribution," Aug. 1993.
Rosario Gennaro et al., "A Framework for Password-Based Authenticated Kay Exchange," Aug. 6, 2003.
Shai Halevi et al., "Public-key Cryptography and Password Protocols," Feb. 2, 1999.

(Continued)

*Primary Examiner* — Nasser Moazzami
*Assistant Examiner* — Michael S McNally

(57) ABSTRACT

A method is provided for use in secure electronic communication. The method may include obtaining a password shared with an intended key exchange entity and sending a key exchange request including a first value to the intended key exchange entity. The method may also include receiving a key exchange reply including a permutation of a first quadratic residue of the first value, and calculating a second quadratic residue of the first value based on the key exchange reply. Further, the method may also include determining a second value shared with the key exchange entity based on the first quadratic residue and the second quadratic residue.

19 Claims, 4 Drawing Sheets

OTHER PUBLICATIONS

David P. Jablon, "Strong Password-Only Authenticated Key Exchange," Mar. 2, 1997.
Jonathan Katz at al., "Efficient Password-Authenticated Kay Exchange Using Human-Memorable Passwords."
Taekyoung Kwon, "Authentication and Key Agreement via Memorable Password."
Thomas Wu, "The Secure Remote Password Protocol," Nov. 11, 1997.
M. Zhang and Y. Fang, "Security Analysis and Enhancements of 3GPP Authentication and Key Agreement Protocol," IEEE Transactions on Wireless Communications, 4 (2005), pp. 734-742.
M. Zhang, "Password Authenticated Key Exchange Using Quadratic Residues," ACNS 2004, pp. 233-247.
M. Zhang, "New Approaches to Password Authenticated Key Exchange Based on RSA," ASIACRYPT 2004, pp. 230-244.
M. Zhang, "Further Analysis of Password Authenticated Key Exchange Protocol Based on RSA for Imbalanced Wireless Networks," ISC 2004, pp. 13-24.
M. Zhang, "Adaptive Protocol for Entity Authentication and Key Agreement in Mobile Networks," ICISC 2003, pp. 166-183.
M. Zhang and A. H. Chan, "Maximum Correlation Analysis of Nonlinear S-boxes in Stream Ciphers," CRYPTO 2000, pp. 501-551.
M. Zhang, C. Carroll, and A. H. Chan, "The Software-Oriented Stream Cipher SSC2," FSE 2000, pp. 31-48.
M. Zhang, C. Carroll, and A. H. Chan, "Analysis of IS-95 CDMA Voice Privacy," Selected Areas in Cryptography, 2000, pp. 1-13.
M. Zhang, "Maximum Correlation Analysis of Nonlinear Combining Functions in Stream Ciphers," J. Cryptology, 13 (2000), pp. 301-314.
M. Zhang, "Computationally-Efficient Password Authenticated Key Exchange Based on Quadratic Residues," INDOCRYPT 2007, pp. 312-321.
M. Zhang, "Breaking an Improved Password Authenticated Key Exchange Protocol for Imbalanced Wireless Networks," IEEE Communications Letters, 9 (2005), pp. 276-278.
M. Zhang, "Analysis of the SPEKE Password-Authenticated Key Exchange Protocol," IEEE Communications Letters, 8 (2004), pp. 63-65.
M. Zhang, "A Robust Authentication and Key Agreement Protocol for Third-Generation Wireless Networks," Communications and Computer Networks, CCN 2002.
M. Zhang and F. Ma, "Simulated Annealing Approach to the Minimum Distance of Error-Correcting Codes," International Journal of Electronics, 76 (1994), pp. 377-384.

* cited by examiner

QUADRATIC RESIDUE BASED PASSWORD AUTHENTICATED KEY EXCHANGE METHOD AND SYSTEM

CROSS REFERENCE TO RELATED APPLICATIONS

This is based upon and claims the benefit of priority from U.S. Provisional Application No. 60/568,624 to Muxiang Zhang filed on May 6, 2004, the entire contents of which are incorporated herein by reference.

BACKGROUND

Modern computer systems or microprocessor based electronic devices are often interconnected by large scale communication networks. Interconnected systems may be vulnerable to attacks from hackers or other malicious systems. To defend or prevent such attacks, a variety of network security techniques, such as cryptographic tools, have been developed. Cryptographic tools may use large keys (e.g., 512-bit, 1024-bit, 2048-bit keys, or even larger) for encrypting and decrypting messages exchanged between different computer systems.

Because large keys may be impractical or impossible to be remembered by their human users, key exchange protocols including password authenticated key exchange protocols are used to implement secure and practical key usage. Password authenticated key exchange protocols may be more desired when simplicity and convenience are under consideration.

Conventional password authenticated key exchange protocols often use public key based approaches, such as an RSA based password authenticated key exchange protocol described in S. Lucks, *Open key exchange: How to defeat dictionary attacks without encrypting public keys*, Proc. Security Protocol Workshop, Lecture Notes in Computer Science, Vol. 1361 (Springer-Verlag, 1997). However, most RSA based password authenticated key exchange protocols may be shown to be insecure. Further, these conventional password authenticated key exchange protocols may often require a large amount of processing overhead for setting up the protocols, such as establishing common public key parameters between key exchange entities.

DETAILED DESCRIPTION OF PREFERRED EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
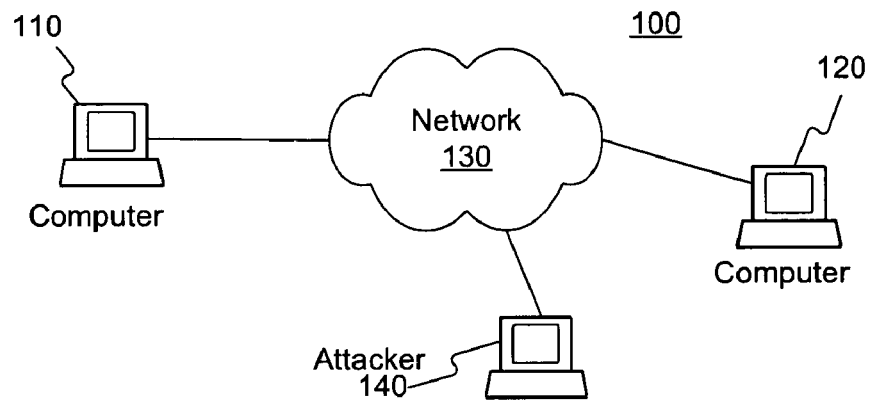
FIG. 1 is a pictorial illustration of an exemplary key exchange environment incorporating certain features of the present invention.

FIG. 1 illustrates an exemplary key exchange environment 100 having exemplary computer systems that incorporate certain embodiments of the present invention. As shown in FIG. 1, computers 110 and 120 may be interconnected via a communication network 130 to exchange information. Communication network 130 may be any appropriate type of communication network, such as the Internet or any private computer network. The Internet may refer to any public accessible network or networks interconnected via communication protocols, such as transmission control protocol/internet protocol (TCP/IP). An attacker 140 may also be connected to communication network 130. Attacker 140 may be any type of computer system or electronic device that, once connected to communication network 130, may be able to receive the information exchanged between computers 110 and 120, and/or to initiate or relay the information exchanged with computers 110 and 120 illegitimately. Although only two computer systems and one attacker are shown in FIG. 1, it is understood that any number of computer systems may be used, and any number of attackers may present.

Figure 2:
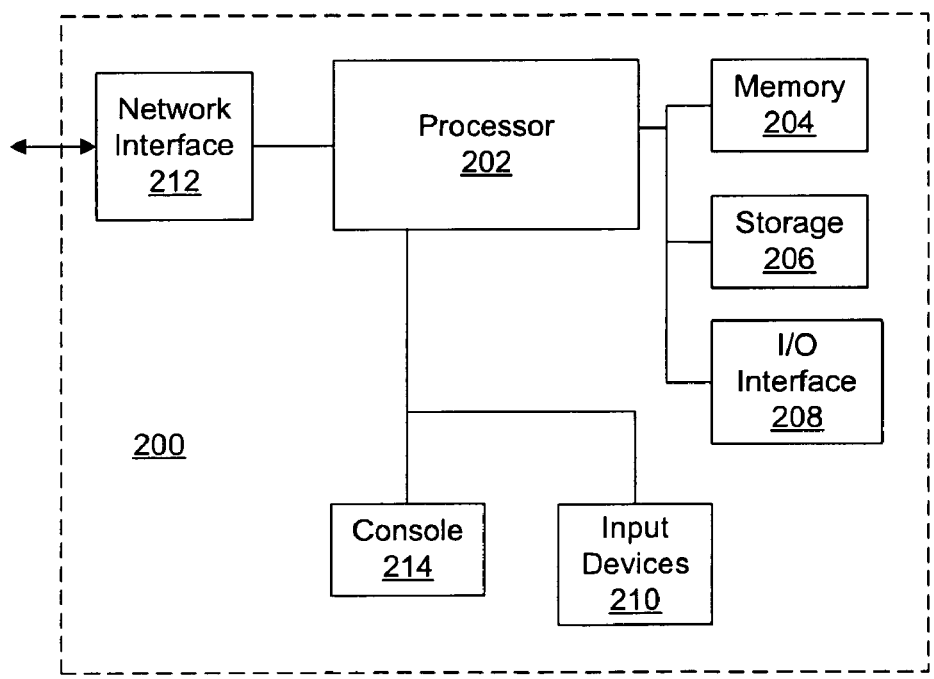
FIG. 2 illustrates a block diagram of an exemplary computer system consistent with the disclosed embodiments.

Computers 110 and 120 may be any type of computer system or microprocessor based electronic device capable of performing certain communication protocol processing. FIG. 2 shows an exemplary computer system 200 corresponding to computers 110 and 120 consistent with the disclosed invention.

As shown in FIG. 2, computer system 200 may include a processor 202, a memory 204, a storage 206, an I/O interface 208, input devices 210, a network interface 212, and a console 214. It is understood that the types and number of the listed devices are exemplary only and not limiting. The number of any or all of the listed devices may be changed, some devices may be removed, and other devices may be added without departing from the principles of the present invention.

Processor 202 may include one or more general purpose microprocessors or special processors, such as network processors or digital signal processors (DSPs). Alternatively, processor 202 may include one or more application-specific integrated circuits (ASICs). Processor 202 may be configured as a central processing unit for computer system 200 or may include processing elements in networking devices, such as network interface 212.

Memory 204 may include one or more memory devices, including, but not limited to, a ROM, a flash memory, a dynamic RAM, and a static RAM. Memory 204 may be configured to store information used by processor 202 and other devices. Storage 206 may include one or more magnetic disk devices, optical disk devices, or other storage devices to provide storage space. Storage 206 may be used to record key information, user information, system information, log messages, databases, or other run-time information. Memory 204 and/or storage 206 may further store instructions (e.g., software) in various known forms to cause the processor 202 to implement, for example, the communication protocol processing activities described herein and according to the present invention(s).

I/O interface 208 may include one or more input/output devices receiving data from processor 202 and sending data to processor 202. Input devices 210 may include any appropriate type of input device including a keyboard, a mouse, or other optical or wireless computer input devices. Console 214 may include one or more computer screens configured to display information to an administrator or a user. Further, network interface 212 may be any appropriate type of network interface adaptor capable of connecting to communication network 130 via various network standards. Through respective network interfaces, computers 110 and 120 may communicate with each other to exchange information.

To secure the information exchanged, computers 110 and 120 may encrypt the information before transmission and decrypt the encrypted information after receipt. A shared session key may be acquired by both computers 110 and 120 for use in encryption and decryption. Computers 110 and 120 may securely exchange the shared session key by implementing a quadratic residue encrypted key exchange (QR-EKE) based on a shared password between them.

A quadratic residue may refer to a number-theoretic concept reflecting relationships among certain numbers. To explain these number-theoretic concepts, certain terms and relationships may be illustrated below. In the disclosure, $\{0,1\}^i$ may denote a set of binary strings of length i, and $\{0,1\}^*$ may denote a set of binary strings of a definite length. Further, $Z_n$ may denote a set of non-negative integers lesser than a positive integer n, and $Z_n^*$ may denote a set of integers in $Z_n$ that are relatively prime to n.

When provided that n and e are positive integers and a is an integer relatively prime to n, if congruence $x^2 \equiv a \pmod{n}$ has a solution, a is a quadratic residue of n. In general, a may be an e-th power residue of n if $x^e \equiv a \pmod{n}$ has a solution, where e is a natural number. As the number n may have more than one quadratic residue, $Q_n$ may be used to denote a set of all quadratic residues of n. On the other hand, $\overline{Q}_n$ may denote all numbers that are not quadratic residues of n. A Legendre symbol $$\left(\frac{a}{n}\right)$$

may be defined to be 1 if $a \in Q_n$, and to be $-1$ if $a \in \overline{Q}_n$.

Further, n may be a Blum integer. The Blum integer n may be represented as n=pq, where p and q may be distinct primes of approximately the same size and $p \equiv q \equiv 3 \pmod{4}$. As such, every quadratic residue a of n, the congruence $x^2 \equiv a \pmod{n}$ may have four solutions $x_1, x_2, x_3$, and $x_4$ in $Z_n^*$. For any integer $\gamma \in Z_n^*$, a unique square root $x_i$, $1 \leq i \leq 4$, may be provided such that $x_i \gamma$ is also a quadratic residue of n, that is, $$\left(\frac{x_i}{p}\right) = \left(\frac{\gamma}{p}\right) \text{ and } \left(\frac{x_i}{q}\right) = \left(\frac{\gamma}{q}\right).$$

Moreover, a function $f: Q_n \to Q_n$ defined by $f(x) = x^2 \mod n$ is a permutation. An inverse function of f may be represented as:

$$f^{-1}(y) = y^{((p-1)(q-1)+4)/8} \mod n \tag{1}$$

Further, for every positive integer t, a function $f_t: Q_n \to Q_n$ defined by $f_t(x) = x^{2^t} \mod n$ is also a permutation. Similarly, for $z \in Q_n$, an inverse function $f_t^{-1}(z)$ may be computed by applying $f^{-1}$ to z for t times.

In operation, computers 110 and 120 may use quadratic residues of a public parameter n (e.g., a Blum integer) and other relationships as explained above to implement the quadratic residue encrypted key exchange protocol. Computers 110 and 120 may have identities used to identify the computers and a source and destination of the protocol entities. For example, computer 110 may have an identity A and computer 120 may have an identity B. Identities A and B may include any appropriate type of identification, such as a name, network address, serial number, and/or any combination thereof.

Further, computer 110 and computer 120 may also share a password w. The password w may be any appropriate type of password that may be used and/or memorized by a user of an individual computer system. The user may enter the shared password w into computer 110 or computer 120 before starting the key exchange protocol. Alternatively, the user may store the shared password w in computers 110 and 120 in a secured format such that the computers may automatically retrieve the shared password w before starting the key exchange protocol or at the beginning of the key exchange protocol communication. An overall protocol sequence of an exemplary password authenticated quadratic residue encrypted key exchange protocol is shown in FIG. 3.

Figure 3:
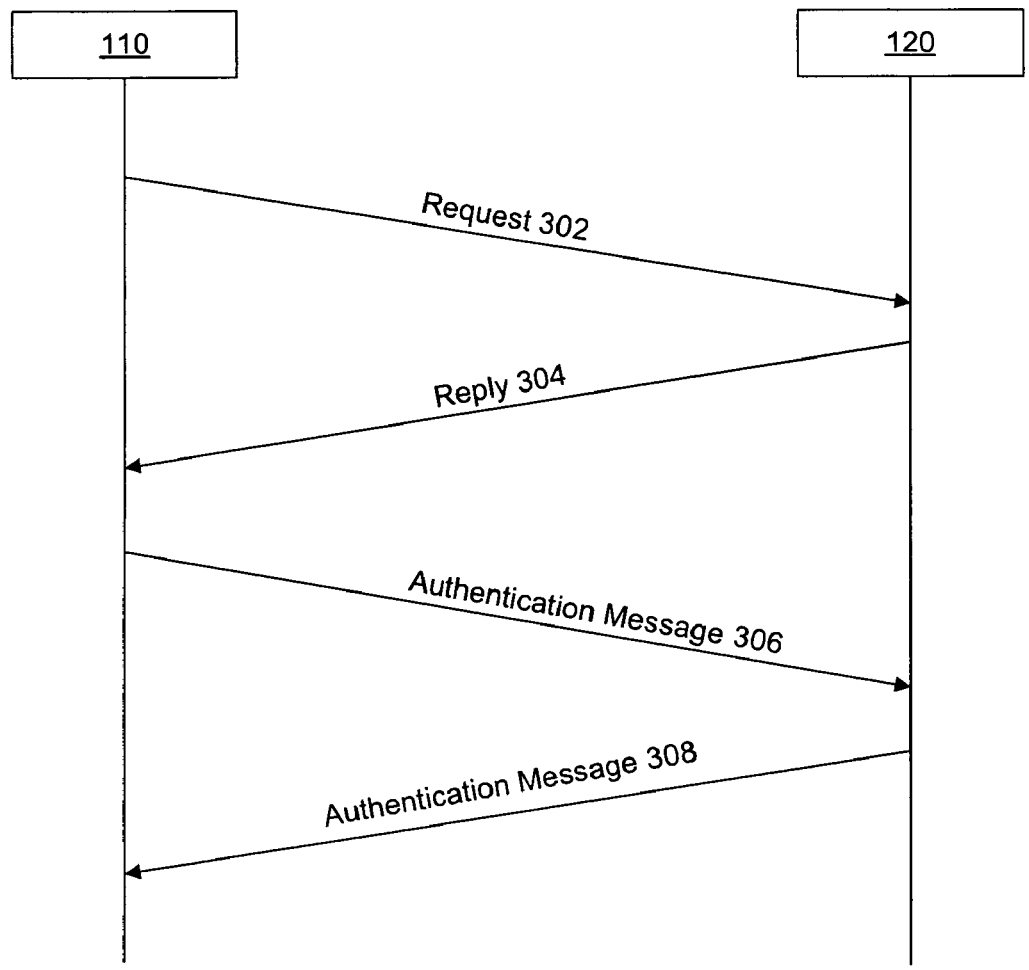
FIG. 3 illustrates a sequence diagram of an exemplary quadratic residue encrypted key exchange protocol.

As shown in FIG. 3, computer 110 may initiate the key exchange protocol by sending a request 302 to computer 120. Computer 120 may receive request 302 and may further perform certain processing according to request 302. Computer 120 may then send a reply 304 to computer 110. After receiving reply 304, computer 110 may verify that reply 304 is a valid replay and determine a shared secret. Computers 110 and 120 may then start an authentication process to establish a shared session key sk base on the shared secret. Computer 110 may send an authentication message 306 to computer 120. Computer 120 may, after verifying authentication message 306, send a reply authentication message 308 to computer 110. The session key sk may be established after a successful mutual authentication process.

As explained, computer 110 may start the key exchange protocol by sending request 302 to computer 120. Request 302 may include a public parameter n and a random number $r_A \in \{0,1\}^k$. The public number n may be an odd Blum integer and the random number $r_A$ may be generated by any appropriate type of random number generator. In one embodiment, the public number n may also be significantly large. The random number $r_A$ may be of a length of k bits, where k is a predetermined security parameter. For example, k may be chosen as 160 or any other appropriate value depending on a particular application. Request 302 may then be received by computer 120.

Figure 4:
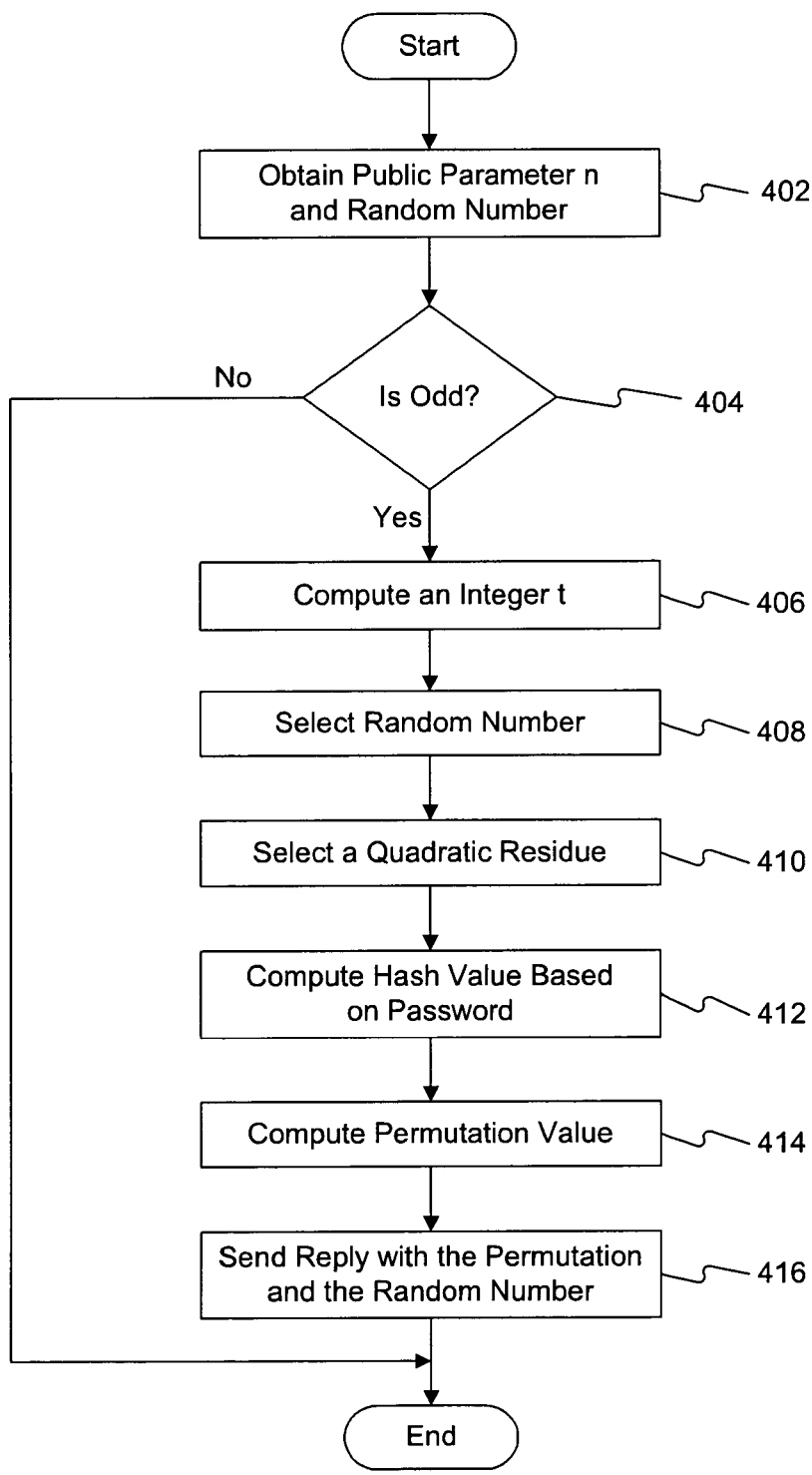
FIG. 4 illustrates an exemplary reply process performed by a computer system consistent with the disclosed embodiments.

Once receiving request 302, computer 120 may perform a reply process as shown in FIG. 4. Computer 120 may obtain the public parameter n and the random number $r_A$ from request 302 (step 402). Computer 120 may then check whether n is an odd number (step 404). If n is not an odd number (step 404; no), computer 120 may decide to reject request 302 and to end the reply process. Computer 120 may send a reject message back to computer 110. Alternatively, computer 120 may discard request 302 without replying to request 302. Although an odd number is used for exemplary purposes, other numbers may also be used without departing from the principle of the present invention.

On the other hand, if n is an odd number (step 404; yes), computer 120 may continue the reply process. Computer 120 may compute an integer $t = \lfloor \log_2 n \rfloor$ (step 406). Computer 120 may also select a random number $r_B \in \{0,1\}^k$ (step 408). Further, computer 120 may randomly select a quadratic residue $\alpha$ from $Q_n$ (step 410). To select the random quadratic residue $\alpha$, computer 120 may select a random number from $Z_n^*$ and raise the selected random number to the power of 2. Computer 120 may combine the shared password w, random number $r_A$, random number $r_B$, identity A of computer 110, identity B of computer 120, and the obtained public parameter n into a string x. Computer 120 may then compute a hash $\gamma$ of the string using a hash function H (step 412). Hash function H: $\{0,1\}^* \to Z_n$ may be implemented by any appropriate type of hash function $h: \{0,1\}^* \to \{0,1\}^l$, where l is the length of n (i.e., $l = \lceil \log_2 n \rceil$). Applying the hash function H on x (i.e., H(w, $r_A$, $r_B$, A, B, n)), H(x) may be calculated as: H(x)=h(x), if h(x)<n, otherwise H(x)=h(x)−⌈n/2⌉.

Computer 120 may then compute a permutation value z (step 414). A variable λ may be calculated in order to compute the permutation value. To determine the variable λ, computer 120 may check whether gcd(γ, n)=1; if yes, computer 120 may assign the hash γ to λ. On the other hand, if gcd(γ, n)≠1, computer 120 may assign a random number of $Z_n^*$ to λ. Once the variable λ is assigned, computer 120 may compute the permutation value by $$z=(\lambda \alpha^2)^{2^t} \bmod n \qquad (2).$$

After computing the permutation value z, computer 120 may send reply 304, including both permutation value z and the random number $r_B$ to computer 110.

Figure 5:
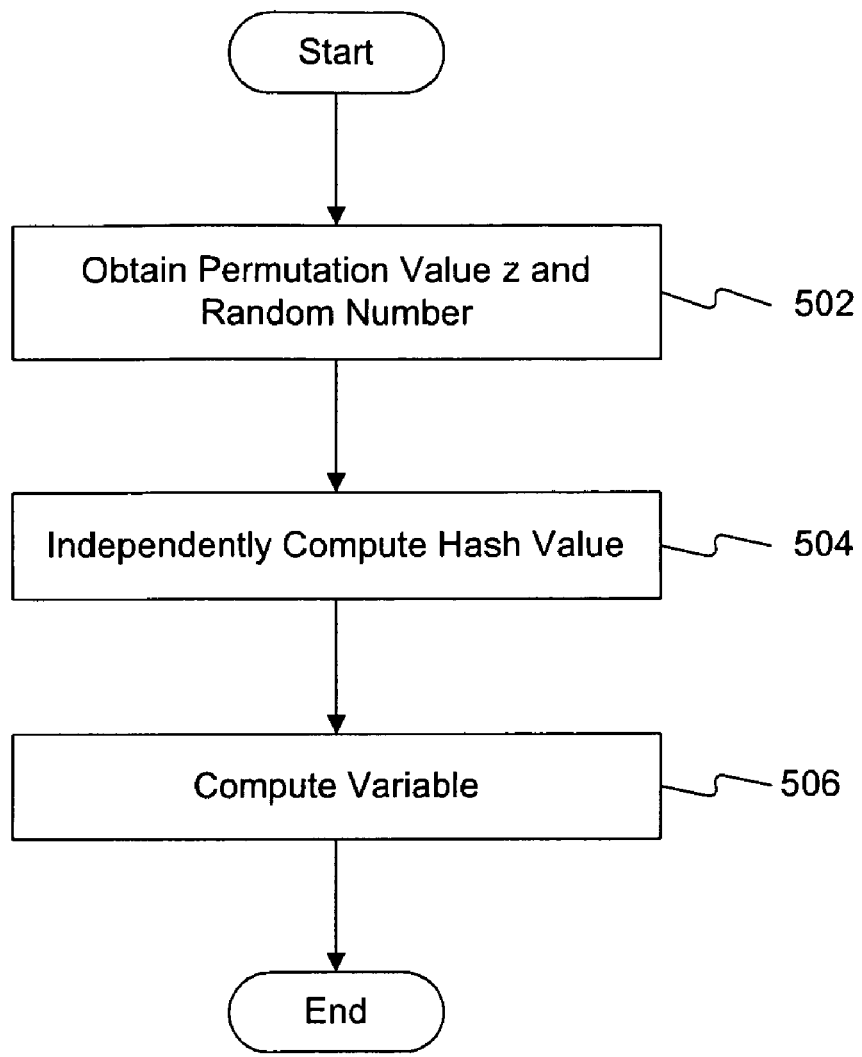
FIG. 5 illustrates an exemplary verification process performed by a computer system consistent with the disclosed embodiments.

After receiving reply 304 from computer 120, computer 110 may perform a verification process, as shown in FIG. 5. At the beginning of the verification process, computer 110 may obtain the permutation value z and the random number $r_B$ from reply 304 (step 502). Computer 110 may then compute a hash γ=H(w, $r_A$, $r_B$, A, B, n) using its own shared password w, original random number $r_A$, received random number $r_B$, identity A of computer 110, identity B of computer 120, and the original public parameter n (step 504). Computer 110 may then compute a variable β (step 506). To compute the variable β, computer 110 may check whether hash γ and n are relatively prime. If γ and n are not relatively prime (i.e., gcd(γ, n)≠1), computer 110 may assign a random number of $Z_n$ to β.

On the other hand, if γ and n are relatively prime (i.e., gcd(γ, n)=1), computer 110 may determine that received permutation value z is a quadratic residue of n. Computer 110 may compute β by $$\beta=(\sigma\gamma^{-1})^{((p-1)(q-1)+4)/8} \bmod n \qquad (3),$$

where σ is a square root of $f_{t-1}^{-1}(z)$ such that σγ is a quadratic residue of n. At this time, computer 110 and computer 120 may have established a shared secret number β=α. The shared secret number may be used to authenticate each other and establish the shared session key sk.

Once computer 110 computes the variable β, computer 110 may initiate an authentication process with computer 120 to establish shared session key sk based on the shared secret number (i.e., α, β). Computers 110 and 120 may implement certain hash functions to carry the authentication process. For example, hash functions $H_1$, $H_2$, $H_3$:$\{0,1\}^* \to \{0,1\}^k$ may be provided. $H_1$, $H_2$, and $H_3$ may be any appropriate types of hash functions and may also be independent random functions. The number k, as explained previously, may be a predetermined security parameter. For example, k may be chosen as 160 or any other appropriate value depending on a particular application.

Computer 110 may calculate a hash value μ=$H_1$(β, $r_A$, $r_B$, A, B, n) and send an authentication message 306. Authentication message 306 may include the hash value μ to computer 120. After receiving authentication 306, computer 120 may obtain hash value μ from authentication 306 and compare hash value μ with an independently computed hash value μ'=$H_1$(α, $r_A$, $r_B$, A, B, n). If μ' is not the same as hash value μ, computer 120 may decide that β does not have the same value as α and a shared secret number has not been established. Computer 120 may reject authentication message 306 from computer 110.

On the other hand, if μ' is the same as hash value μ, computer 120 may decide that a shared secret number has been established. Computer 120 may then compute a hash value η=$H_2$(α, $r_A$, $r_B$, A, B, n) and send computer 110 an authentication message 308 as a reply to authentication message 306. Authentication message 308 may include a hash value η calculated above. Concurrently, computer 120 may also create a shared session key sk=$H_3$(α, $r_A$, $r_B$, A, B, n). After receiving authentication message 308, computer 110 may obtain the hash value η from authentication message 308 and compare the hash value η with an independently computed hash value η'=$H_2$(β, $r_A$, $r_B$, A, B, n). If η' is not the same as the hash value η, computer 110 may decide to reject authentication message 308 from computer 120.

On the other hand, if η' is the same as hash value η, computer 110 may also create the shared session key sk=$H_3$(β, $r_A$, $r_B$, A, B, n). Once computer 110 and computer 120 both create the shared session key sk, the key exchange protocol processing may be completed. Computer 110 and computer 120 may start a session to exchange secured messages using the shared session key sk.

Computer 110 and computer 120 may also establish more than one session, each of which may require a shared session key. More than one shared key may thus need to be separately obtained by computers 110 and 120. Computer 110 may use a different public parameter n for each session key. Alternatively, computer 110 may use the same public parameter n for some or all of the session keys. When same public parameter n is used, computers 110 and 120 may still perform all calculations according to the protocol explained above. In certain embodiments, computers 110 and 120 may use a cache portion of memory to reduce the calculations when more than one session needs to be established based on the same public parameter n.

Because computer 110 may use the same public parameter n, computer 120 may be configured to cache a hashed value of the public parameter n. That is, computer 120 may calculate a hashed value of the public parameter n and store the hashed value in a cache (e.g., memory 204). The hashed value may be calculated as V=h(n, A). The public parameter n may be determined based on the previous session. The public parameter n may also be that was received in previous session. The identity A of computer 110 may be included in request 302 by computer 110. The initial value of V may be set as 0 if no previous session were established.

After receiving request 302, when computing the integer t (step 406), computer 120 may first calculate a hashed value V'=h(n, A). Computer 120 may then compare V' with V in the cache. If V' is not the same as V, computer 120 may proceed to establish a shared session key through the same steps as described in FIG. 4, as explained above. Once a shared session key is established, computer 120 may store the V' in the cache to be used for next session. On the other hand, if V' is the same as V (i.e., the public parameter n is the same as the previous session), computer 120 may set the integer t as 1 and compute the permutation z according to equation (2). Further, computer 120 may send the integer t in reply 304 along the permutation z and the random number $r_B$. Instead of calculating the integer t based on the public parameter n, computer 110 may directly use the integer t from reply 304 to compute the variable β according to equation (3).

The disclosed embodiments provide a simple and efficient solution to password authenticated key exchange protocols. The quadratic residue based encrypted key exchange protocol may be proven to be secure against off-line dictionary attacks and/or residue attacks. The disclosed key exchange protocol also uses random numbers to compute responses when rejections are made such that any information about rejection events may be unavailable to attackers.

Further, the disclosed embodiments may significantly reduce the amount of calculations in protocol processing. When multiple shared session keys are established based on a same public parameter, cache based protocol processing may be more desirable and more efficient.

The disclosed embodiments also provide an efficient and advantageous protocol that allows protocol entities to authenticate each other and to establish a key for secure communication based on a human memorable password.

Other embodiments of the invention will be apparent to those skilled in the art from consideration of the descriptions provided by this specification. It is intended that the specification and preferred embodiments described herein be considered as exemplary only, with a true scope of the invention(s) being indicated by the following claims.

What is claimed is:

1. A computer-implemented method for use in secure electronic communication, the method comprising the steps, performed by one or more processors, of:
   sending a key exchange request including a first value to an intended key exchange entity;
   receiving a key exchange reply from the intended key exchange entity, the reply comprising a permutation of a first quadratic residue with respect to the first value;
   computing a value of the first quadratic residue from the key exchange reply, the computing comprising:
      identifying an inverse function associated with the received permutation; and
      applying the inverse function to the received permutation a plurality of times;
   calculating a second quadratic residue with respect to the first value based on the key exchange reply, the calculating comprising:
      calculating a hash value based on at least the first value;
      determining that the calculated hash value and the first value are relatively prime; and
      calculating the second quadratic residue based on at least the computed value of the first quadratic residue, the calculated hash value, and the first value; and
   determining a value to be shared with the key exchange entity based on the first quadratic residue and the second quadratic residue, wherein the determining comprises:
      determining that a value of the second quadratic residue corresponds to the computed value of the first quadratic residue; and
      assigning the value of the second quadratic residue to the shared value.

2. The method according to claim 1, further comprising: sending an authentication message including a hash value of the shared value to the key exchange entity.

3. The method according to claim 2, further comprising:
   receiving an authentication reply from the key exchange entity;
   verifying the authentication reply using the shared value; and
   determining a session key based on the shared value.

4. The method according to claim 1, further comprising:
   obtaining a password shared with the intended key exchange entity;
   wherein calculating the hash value comprises:
      calculating the hash value based on the password and the first value.

5. The method according to claim 1, wherein calculating the second quadratic residue comprises:
   determining that the calculated hash value and the first value fail to be relatively prime; and
   assigning a random number to the second quadratic residue if the hash value is not relatively prime to the first value.

6. The method according to claim 1, provided that $\gamma$ is the calculated hash value; $n$ is the first value; $p$ and $q$ are distinct primes of $n$; $n=pq$; $p=q=3 \pmod 4$; and $\sigma$ is a square root of the inverse permutation function of the received permutation, wherein the second quadratic residue $\beta$ is calculated by:

$$\beta=(\sigma\gamma^{-1})^{((p-1)(q-1)+4)/8} \bmod n.$$

7. The method according to claim 1, wherein determining further includes:
   determining that the calculated hash value and the first value are not relatively prime; and
   assigning a random number as the shared value if the first quadratic residue and the second quadratic residue do not have the same values.

8. A computer-implemented method for use in secure electronic communication, the method comprising the steps, performed by one or more processors, of:
   receiving a key exchange request including a first value from an intended key exchange entity;
   selecting a first quadratic residue with respect to the first value from a plurality of quadratic residues with respect to the first value;
   determining a permutation of the first quadratic residue, the determining comprising:
      calculating a hash value based on at least the first value;
      determining that the calculated hash value and the first value are relatively prime; and
      calculating the permutation of the first quadratic residue based on at least the calculated hash value, the first quadratic residue, and the first value; and
   sending a key exchange reply including the permutation to the key exchange entity;
   receiving, from the key exchange entity, an authentication message comprising a hash value of a second quadratic residue with respect to the first value;
   verifying the authentication message based on at least the first quadratic residue and the received hash value, wherein the verifying comprises:
      determining, based on the received hash value, that a value of the second quadratic residue corresponds to a value of the first quadratic residue; and
      defining a value to be shared with the key exchange entity as the value of the first quadratic residue.

9. The method according to claim 8, further comprising: determining a session key based on at least the authentication message.

10. The method according to claim 8, further comprising: sending an authentication reply to the key exchange entity including a second hash value of the first quadratic residue and the first value.

11. The method according to claim 8, wherein selecting the first quadratic residue further includes:
   determining whether the first value is an odd number; and
   randomly selecting the first quadratic residue from the plurality of quadratic residues of the first value if the first value is an odd number.

12. The method according to claim 8, further comprising:
   obtaining a password shared with the intended key exchange entity;
   wherein calculating the hash value comprises:
      calculating the hash value based on the password and the first value; and
   wherein determining the permutation further comprises:
      determining that the hash value fails to be relatively prime to the first value; and
      assigning a random number to the permutation if the calculated hash value is not relative prime to the first value.

13. The method according to claim 8, provided that $\alpha$ is the first quadratic residue; $\lambda$ is the calculated hash value; n is the first value; t is an integer; and $t=\lfloor \log_2 n \rfloor$, wherein the permutation of the first quadratic residue is calculated by:

$$z=(\lambda\alpha_2)^{2^t} \bmod n.$$

14. A computer-implemented method for use in secure electronic communication, the method comprising the steps, performed by one or more processors, of:
receiving a key exchange request including a first value from an intended key exchange entity;
selecting a first quadratic residue with respect to the first value from a plurality of quadratic residues with respect to the first value;
calculating a hash value based on the first value;
determining whether the calculated hash value is the same as a stored hash value corresponding to a previous session; and
determining a permutation of the first quadratic residue based on at least a stored first value corresponding to the previous session, when the calculated hash value is the same as the stored hash value, wherein the determining comprises:
defining a simplified calculation parameter associated with the permutation; and
calculating the permutation of the first quadratic residue based on at least the simplified calculation parameter;
receiving, from the key exchange entity, an authentication message comprising a hash value of a second quadratic residue with respect to the first value;
verifying the authentication message based on at least the first quadratic residue and the hash value of the second quadratic residue, wherein the verifying comprises:
determining, based on the hash value of the second quadratic residue, that a value of the second quadratic residue corresponds to a value of the first quadratic residue; and
defining a value to be shared with the key exchange entity as the value of first quadratic residue.

15. The method according to claim 14, further comprising:
determining that the first value is not the same as the first value of a previous session if the calculated hash value is not the same as the stored hash value;
determining a permutation of the first quadratic residue using normal calculation parameters; and
storing the calculated hash value as the stored hash value.

16. The method according to claim 14, wherein the key exchange request further includes a random number and an identity of the intended key exchange entity, and the calculated hash value is based on the first value and the identity of the intended key exchange entity.

17. A computer-readable medium storing instructions that, when executed by a processor, perform a method for use in secure electronic communication, the method comprising the steps of:
sending a key exchange request including a first value to an intended key exchange entity;
receiving a key exchange reply from the intended key exchange entity, the reply comprising a permutation of a first quadratic residue with respect to the first value;
computing a value of the first quadratic residue from the key exchange reply, the computing comprising:
identifying an inverse function associated with the received permutation; and
applying the inverse function to the received permutation a plurality of times;
calculating a second quadratic residue with respect to the first value based on the key exchange reply, the calculating comprising:
calculating a hash value based on at least the first value;
determining that the calculated hash value and the first value are relatively prime; and
calculating the second quadratic residue based on at least the computed value of the first quadratic residue, the calculated hash value, and the first value; and
determining a value to be shared with the key exchange entity based on the first quadratic residue and the second quadratic residue, wherein the determining comprises:
determining that a value of the second quadratic residue corresponds to the computed value of the first quadratic residue; and
assigning the value of the second quadratic residue to the shared value.

18. A computer-readable medium storing instructions that, when executed by a processor, perform a method for use in secure electronic communication, the method comprising the steps of:
receiving a key exchange request including a first value from an intended key exchange entity;
selecting a first quadratic residue with respect to the first value from a plurality of quadratic residues with respect to the first value;
determining a permutation of the first quadratic residue, the determining comprising:
calculating a hash value based on at least the first value;
determining that the calculated hash value and the first value are relatively prime; and
calculating the permutation of the first quadratic residue based on at least the calculated hash value, the first quadratic residue, and the first value; and
sending a key exchange reply including the permutation to the key exchange entity;
receiving, from the key exchange entity, an authentication message comprising a hash value of a second quadratic residue with respect to the first value;
verifying the authentication message based on at least the first quadratic residue and the received hash, wherein the verifying comprises:
determining, based on the received hash value, that a value of the second quadratic residue corresponds to a value of the first quadratic residue; and
defining a value to be shared with the key exchange entity as the value of first quadratic residue.

19. A computer-readable medium storing instructions that, when executed by a processor, perform a method for use in secure electronic communication, the method comprising the steps of:
receiving a key exchange request including a first value from an intended key exchange entity;
selecting a first quadratic residue with respect to the first value from a plurality of quadratic residues with respect to the first value;
calculating a hash value based on the first value;
determining whether the calculated hash value is the same as a stored hash value corresponding to a previous session; and
determining a permutation of the first quadratic residue based on at least a stored first value corresponding to the previous session, when the calculated hash value is the same as the stored hash value, wherein the determining comprises:
defining a simplified calculation parameter associated with the permutation; and calculating the permutation of the first quadratic residue based on at least the simplified calculation parameter;

receiving, from the key exchange entity, an authentication message comprising a hash value of a second quadratic residue with respect to the first value;

verifying the authentication message based on at least the first quadratic residue and the received hash value, wherein the verifying comprises:

determining, based on the received hash value, that a value of the second quadratic residue corresponds to a value of the first quadratic residue; and defining a value to be shared with the key exchange entity as the value of first quadratic residue.

* * * * *